United States Patent
Yoshizawa

(10) Patent No.: US 6,983,309 B1
(45) Date of Patent: Jan. 3, 2006

(54) ELECTRONIC APPARATUS TRANSMITTING ELECTRONIC MAIL INCLUDING IMAGE INFORMATION, A CONTROL APPARATUS, AND A STORAGE MEDIUM

(75) Inventor: Hiroyuki Yoshizawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 166 days.

(21) Appl. No.: 09/667,723

(22) Filed: Sep. 22, 2000

(30) Foreign Application Priority Data

Oct. 26, 1999 (JP) ............................. 11-304627

(51) Int. Cl.
G06F 15/16 (2006.01)
G06F 15/173 (2006.01)
G06F 17/00 (2006.01)
G06F 17/60 (2006.01)
H04K 1/00 (2006.01)
H04L 9/00 (2006.01)

(52) U.S. Cl. ............... 709/206; 709/207; 709/225; 705/64; 705/67; 707/104.1; 713/186; 713/201

(58) Field of Classification Search ........ 709/204–207, 709/225, 240, 329; 705/18, 64, 67, 75; 725/11, 19; 707/104.1; 713/186, 200–202
See application file for complete search history.

(56) References Cited

U.S. PATENT DOCUMENTS

| | | | | |
|---|---|---|---|---|
| 5,103,486 A * | 4/1992 | Grippi | ............. | 382/116 |
| 5,251,265 A * | 10/1993 | Dohle et al. | ............. | 382/123 |
| 5,432,864 A * | 7/1995 | Lu et al. | ............. | 382/118 |
| 5,548,753 A * | 8/1996 | Linstead et al. | ............. | 707/1 |
| 5,689,642 A * | 11/1997 | Harkins et al. | ............. | 709/207 |
| 5,732,229 A * | 3/1998 | Dickinson | ............. | 345/764 |
| 5,752,059 A * | 5/1998 | Holleran et al. | ............. | 709/245 |
| 5,944,787 A * | 8/1999 | Zoken | ............. | 709/206 |
| 5,972,546 A * | 10/1999 | Bjelkhagen | ............. | 430/10 |
| 5,978,781 A * | 11/1999 | Sansone | ............. | 705/408 |
| 5,999,967 A * | 12/1999 | Sundsted | ............. | 709/206 |
| 6,018,761 A * | 1/2000 | Uomini | ............. | 709/206 |
| 6,085,321 A * | 7/2000 | Gibbs et al. | ............. | 713/170 |
| 6,163,842 A * | 12/2000 | Barton | ............. | 713/176 |
| 6,167,147 A * | 12/2000 | Mowry et al. | ............. | 382/135 |
| 6,182,076 B1 * | 1/2001 | Yu et al. | ............. | 707/10 |
| 6,189,103 B1 * | 2/2001 | Nevarez et al. | ............. | 713/201 |
| 6,209,005 B1 * | 3/2001 | Harker et al. | ............. | 715/501.1 |
| 6,252,588 B1 * | 6/2001 | Dawson | ............. | 345/752 |
| 6,256,736 B1 * | 7/2001 | Coppersmith et al. | ............. | 713/176 |
| 6,324,271 B1 * | 11/2001 | Sawyer et al. | ............. | 379/142.05 |

(Continued)

FOREIGN PATENT DOCUMENTS

JP 3-106141 5/1991

(Continued)

OTHER PUBLICATIONS

McGuinness, Rhonda, "Everything you Wanted to Know About Signature Files," WebNovice.com, 1997.*

(Continued)

Primary Examiner—Jason Cardone
Assistant Examiner—Melvin H. Pollack
(74) Attorney, Agent, or Firm—Staas & Halsey LLP

(57) ABSTRACT

An electronic apparatus, a control apparatus, and a storage medium include a transmitter transmitting electronic mail in which a symbol including image information, which enables a sender to be specified therefrom, is included within an electronic signature file of the electronic mail, said electronic signature file including an email address of the sender. The transmitter transmits the electronic mail only when an error, between the image information and prestored image information, is within a predetermined range.

22 Claims, 11 Drawing Sheets

U.S. PATENT DOCUMENTS

| | | | | |
|---|---|---|---|---|
| 6,324,650 B1 * | 11/2001 | Ogilvie | .................. | 713/202 |
| 6,332,193 B1 * | 12/2001 | Glass et al. | .................. | 713/170 |
| 6,356,935 B1 * | 3/2002 | Gibbs | .................. | 709/206 |
| 6,360,010 B1 * | 3/2002 | Hu et al. | .................. | 382/180 |
| 6,367,013 B1 * | 4/2002 | Bisbee et al. | .................. | 713/178 |
| 6,381,344 B1 * | 4/2002 | Smithies et al. | .................. | 382/115 |
| 6,415,039 B2 * | 7/2002 | Uraki et al. | .................. | 382/100 |
| 6,438,251 B1 * | 8/2002 | Yamaguchi | .................. | 382/100 |
| 6,438,584 B1 * | 8/2002 | Powers | .................. | 709/206 |
| 6,446,115 B2 * | 9/2002 | Powers | .................. | 709/206 |
| 6,526,436 B1 * | 2/2003 | Shiraishi et al. | .................. | 709/206 |
| 6,533,171 B1 * | 3/2003 | Porter | .................. | 235/380 |
| 6,553,494 B1 * | 4/2003 | Glass | .................. | 713/186 |
| 6,584,564 B2 * | 6/2003 | Olkin et al. | .................. | 713/152 |
| 6,611,916 B1 * | 8/2003 | Cacace-Bailey et al. | .... | 713/201 |
| 6,615,191 B1 * | 9/2003 | Seeley | .................. | 705/54 |
| 6,745,327 B1 * | 6/2004 | Messing | .................. | 713/170 |
| 6,751,733 B1 * | 6/2004 | Nakamura et al. | .......... | 713/182 |
| 6,820,202 B1 * | 11/2004 | Wheeler et al. | ............ | 713/185 |
| 6,848,104 B1 * | 1/2005 | Van Ee et al. | .............. | 719/310 |
| 6,892,307 B1 * | 5/2005 | Wood et al. | ................. | 713/201 |

FOREIGN PATENT DOCUMENTS

| | | |
|---|---|---|
| JP | 5-204795 | 8/1993 |
| JP | 10-63590 | 3/1998 |
| WO | 00/02149 | 1/2000 |

OTHER PUBLICATIONS

Brown, Ronald H., et al. Digital Signature Standard (DSS), FIPS PUB 186, May 19,1994.*

"Embedding a Web Page" WarpSpeedHelp.com, 1998.*

"V's Email Sig HTML" Tripod article, Jun. 25, 1999.*

Carpintero, A., et al. "Automatic Face Recognition for Access Control," Proceedings of 1993 Intl. Joint Conference on Neural Networks, vol. 2, Oct. 25-29, 1993, pp. 1289-1292.*

Tistarelli, Massimo, et al. "Design of a Vision System for Identity Verification," Proceedings of the 32nd Hawaii Intl. Conference on System Sciences, vol. 3, Jan. 8, 1999, pp. 1-9.*

Nagao, Mitsuyoshi, et al. "MTS Approach to Facial Image Recognition," IEEE Intl. Conference on Systems, Man, and Cybernetics, vol. 4, Oct. 15, 1999, pp. 937-942.*

Narayanaswamy, Shankar, et al. "User Interface for a PCS Smart Phone," IEEE Intl Conference on Multimedia Computing and Systems, vol. 1, Jul. 1999, pp. 777-781.*

Catalog of Toshiba Libretto ff 1100 and translation.

Catalog of Panasonic Let's note/C33EA and translation.

Catalog of Sony VAIO PCG-C1S and translation.

* cited by examiner

FIG. 6

THIS IS ○○.

(TEXT)

GOOD BYE.

POSITION NAME
Name : NAME OF CREATOR
     : NAME IN OTHER LANGUAGE
E-mail : ADDRESS OF ELECTRONIC MAIL
HomePage : URL OF WEBPAGE

ELECTRONIC APPARATUS TRANSMITTING ELECTRONIC MAIL INCLUDING IMAGE INFORMATION, A CONTROL APPARATUS, AND A STORAGE MEDIUM

BACKGROUND OF THE INVENTION

This application claims the benefit of a Japanese Patent Application No. 11-304627 filed Oct. 26, 1999, in the Japanese Patent Office, the disclosure of which is hereby incorporated by reference.

1. Field of the Invention

The present invention generally relates to electronic apparatuses, control apparatuses and storage media, and more particularly to an electronic apparatus having an electronic mail function, a control apparatus for controlling such an electronic apparatus, and a computer-readable storage medium which stores a program for causing a computer to have the electronic mail function.

In this specification, an electronic apparatus refers to an apparatus having an electronic mail function, and includes computers such as personal computers, word processors, electronic notebooks, and intelligent telephone sets which includes various functions in addition to the normal telephone functions. In addition, the electronic mail function refers to a function including sending and/or receiving electronic mail (e-mail). The electronic mail function may of course include functions of creating and editing electronic mail.

2. Description of the Related Art

Conventional electronic mail systems basically use a text-based signature file, and an electronic mail is transmitted by adding a predetermined signature file or, by writing a signature within a document by character information. For this reason, the signature file itself does not have a specific function.

A multi-media electronic mail environment is already provided, and enables images such as photographs and/or audio to be included in the electronic mail, and also enables processing of audio-based or image-based electronic mail. However, the signature file remains in the text form.

Accordingly, if the signature file is copied, a third person can easily impersonate as another person. As a result, it is impossible to judge by a simple means whether or not a sender of the electronic mail is actually the person himself, thereby making the security of the electronic mail poor.

For example, a Japanese Laid-Open Patent Application no. 3-106141 proposes a document circulating system which displays on a circulating document an icon for indicating an existence of a comment.

In addition, a Japanese Laid-Open Patent Application No. 5-204795 proposes an electronic mail system which has the functions of displaying a destination and a portrait of the sender for confirmation, listing people with the same name or position in a file, and transmitting the electronic mail based on a symbol such as the portrait.

Users of electronic mail are increasing every year due to the rapid growth of the Internet and intranet. Recently, communication functions and electronic mail software are in many cases installed as standard functions in an operating system (OS). Hence, the communication speed is increasing in the internet and local area networks (LANs). As a result, it has recently become possible to exchange data having a large size which was realistically impossible to exchange conventionally due to the limited communication speed. In addition, even in the general electronic mail software and the like, documents having the HTML format are supported in most cases, and it is anticipated that the number of users who will use such software will considerably increase in the future. Accordingly, it is desirable to further improve the electronic mail system to suit the multi-media electronic mail environment.

However, as is the case of the electronic mail system proposed in the Japanese Laid-Open Patent Application No. 5-204795 described above, although the conventional proposed electronic mail system has the function of transmitting the electronic mail based on the symbol such as the portrait, it is impossible to confirm at the receiving end that the received portrait and the sender of the electronic mail are the same person. For this reason, it is impossible to prevent a third person from improperly copying the image of the electronic mail and impersonating as another person. In other words, there are problems in that there is no simple method of confirming that the sender of the electronic mail is the person himself, and that the security of the electronic mail is poor.

In addition, the conventional electronic mail system provides no means of simply comprehending the importance of the received electronic mail or the summary of the contents of the received electronic mail before reading the received electronic mail. As a result, there are problems in that the user cannot know the importance and the contents of the summary of the received electronic mail until the user actually reads the received electronic mail, and that a so-called junk mail cannot be confirmed unless the junk mail is actually read.

SUMMARY OF THE INVENTION

Accordingly, it is a general object of the present invention to provide a novel and useful electronic apparatus, control apparatus and computer-readable storage medium, in which the problems described above are eliminated.

Another and more specific object of the present invention to provide an electronic apparatus, control apparatus and storage medium which can prevent a third person from copying an electronic mail and impersonating as another person, enable confirmation by a simple means that a sender of the electronic mail is the person himself, and enable the user to know the importance or summary of the contents of the received electronic mail to a certain extent before actually reading the received electronic mail.

Still another object of the present invention is to provide an electronic apparatus comprising transmitting means for transmitting an electronic mail in which a symbol including image information which enables a sender to be specified therefrom is included within signature information of the electronic mail.

The electronic apparatus may further comprise generating means for generating the image information by inputting an image of the sender. In this case, the transmitting means may transmit the electronic mail only when an error between the image information generated by the generating means and prestored image information is within a predetermined range. In addition, the image information may include an image related to at least a face of the sender.

According to the electronic apparatus of the present invention, it is possible to prevent a third person from copying the electronic mail and impersonating as another person, and enable confirmation by a simple means that the sender of the electronic mail is the person himself, so that the security of the electronic mail is improved.

The electronic apparatus may further comprise adding means for adding to the signature information a parameter which indicates an importance of the electronic mail. In this case, the parameter may indicate the importance of the electronic mail by a display format of the signature information. In addition, the parameter may include information which indicates a display priority order of the electronic mail. The parameter may include character, image and/or audio information indicating a summary of the electronic mail. Furthermore, the information which indicates the display priority order of the electronic mail may include at least one of a display position and a display timing of the signature information.

According to the electronic apparatus of the present invention, the parameter which enables comprehension of the importance or the summary of the contents of the received electronic mail to a certain extent before actually reading the electronic mail, is added to the signature information. As a result, it is possible to know the importance and the summary of the contents of the received electronic mail without actually reading the received electronic mail, and the so-called junk mail can be confirmed without actually reading the junk mail.

The symbol may include information used for linking to the sender.

A further object of the present invention is to provide an electronic apparatus comprising receiving means for receiving an electronic mail in which a symbol including image information which enables a sender to be specified therefrom is included within signature information of the electronic mail, and display means for displaying the image information of the electronic mail.

The image information may include an image related to at least a face of the sender.

According to the electronic apparatus of the present invention, it is possible to prevent a third person from improperly copying the image of the electronic mail and impersonating as another person, and to confirm by a simple means that the sender of the electronic mail is the person himself.

The signature information may further include a parameter which indicates an importance of the electronic mail, and the electronic apparatus may further comprise recognizing means for recognizing the importance based on the parameter.

The receiving means may receive information which indicates an importance of the signature information, and the electronic apparatus may further comprise display control means for displaying, based on the information which indicates the importance of the signature information, the signature information on the display means with a format which enables recognition of the importance. In this case, the information which indicates the importance of the signature information may be included within the signature information.

The receiving means may receive information which indicates a display priority order of the signature information, and the electronic apparatus may further comprise means for determining a display position of the signature information based on the information which indicates the display priority order of the signature information.

The receiving means may receive information which indicates a display priority order of the signature information, and the electronic apparatus may further comprise means for determining a display timing of the signature information based on the information which indicates the display priority order of the signature information. In this case, the information which indicates the display priority order of the signature information may be included within the signature information.

The signature information may include character, image and/or audio information indicating a summary of the electronic mail.

The symbol may include information used for linking to the sender.

Another object of the present invention is to provide an electronic apparatus comprising receiving means for receiving an electronic mail including at least signature information and information which indicates an importance thereof, display means for displaying the electronic mail, and display control means for displaying the signature information on the display means with a format which enables recognition of the importance, based on the information which indicates the importance.

Still another object of the present invention is to provide an electronic apparatus comprising transmitting means for transmitting an electronic mail by adding to signature information of the electronic mail a parameter which indicates an importance of the electronic mail.

According to the electronic apparatus of the present invention, the parameter which enables comprehension of the importance or the summary of the contents of the received electronic mail to a certain extent before actually reading the electronic mail, is added to the signature information. As a result, it is possible to know the importance and the summary of the contents of the received electronic mail without actually reading the received electronic mail, and the so-called junk mail can be confirmed without actually reading the junk mail.

A further object of the present invention is to provide a control apparatus for an electronic apparatus having transmitting means, comprising control means for controlling the transmitting means to transmit an electronic mail in which a symbol including image information which enables a sender to be specified therefrom is included within signature information of the electronic mail.

Another object of the present invention is to provide a control apparatus for an electronic apparatus having receiving means for receiving an electronic mail and display means for displaying the received electronic mail, comprising control means for controlling the receiving means to receive an electronic mail in which a symbol including image information which enables a sender to be specified therefrom is included within signature information of the electronic mail, and for controlling the display means to display the image information of the electronic mail.

Still another object of the present invention is to provide a control apparatus for an electronic apparatus having receiving means for receiving an electronic mail including at least signature information and information which indicates an importance thereof and display means for displaying the received electronic mail, comprising display control means for controlling the display means to display the signature information with a format which enables recognition of the importance, based on the information which indicates the importance.

A further object of the present invention is to provide a computer-readable storage medium which stores a program for causing a computer to have an electronic mail function, comprising transmitting means for causing the computer to transmit an electronic mail in which a symbol including image information which enables a sender to be specified therefrom is included within signature information of the electronic mail.

Another object of the present invention is to provide a computer-readable storage medium which stores a program for causing a computer to have an electronic mail function, comprising receiving means for causing the computer to receive an electronic mail in which a symbol including image information which enables a sender to be specified therefrom is included within signature information of the electronic mail, and display means for causing the computer to display the image information of the electronic mail.

Still another object of the present invention is to provide a computer-readable storage medium as which stores a program for causing a computer to have an electronic mail function, comprising receiving means for causing the computer to receive an electronic mail including at least signature information and information which indicates an importance thereof, display means for causing the computer to display the electronic mail, and display control means for causing the computer to display the signature information by the display means with a format which enables recognition of the importance, based on the information which indicates the importance.

According to the storage medium of the present invention, it is possible to prevent a third person from improperly copying the image of the electronic mail and impersonating as another person, and to confirm by a simple means that the sender of the electronic mail is the person himself.

Therefore, according to the present invention, it is possible to prevent a third person from improperly copying the image of the electronic mail and impersonating as another person, and to confirm by a simple means that the sender of the electronic mail is the person himself, thereby improving the security of the electronic mail. In addition, the parameter which enables comprehension of the importance or the summary of the contents of the received electronic mail to a certain extent before actually reading the electronic mail, is added to the signature information. As a result, it is possible to know the importance and the summary of the contents of the received electronic mail without actually reading the received electronic mail, and the so-called junk mail can be confirmed without actually reading the junk mail.

Other objects and further features of the present invention will be apparent from the following detailed description when read in conjunction with the accompanying drawings.

BRIEF DESCRIPTION OF THE DRAWINGS

FIG. 6 is a diagram showing a normal electronic mail;

DESCRIPTION OF THE PREFERRED EMBODIMENTS

Figure 1:
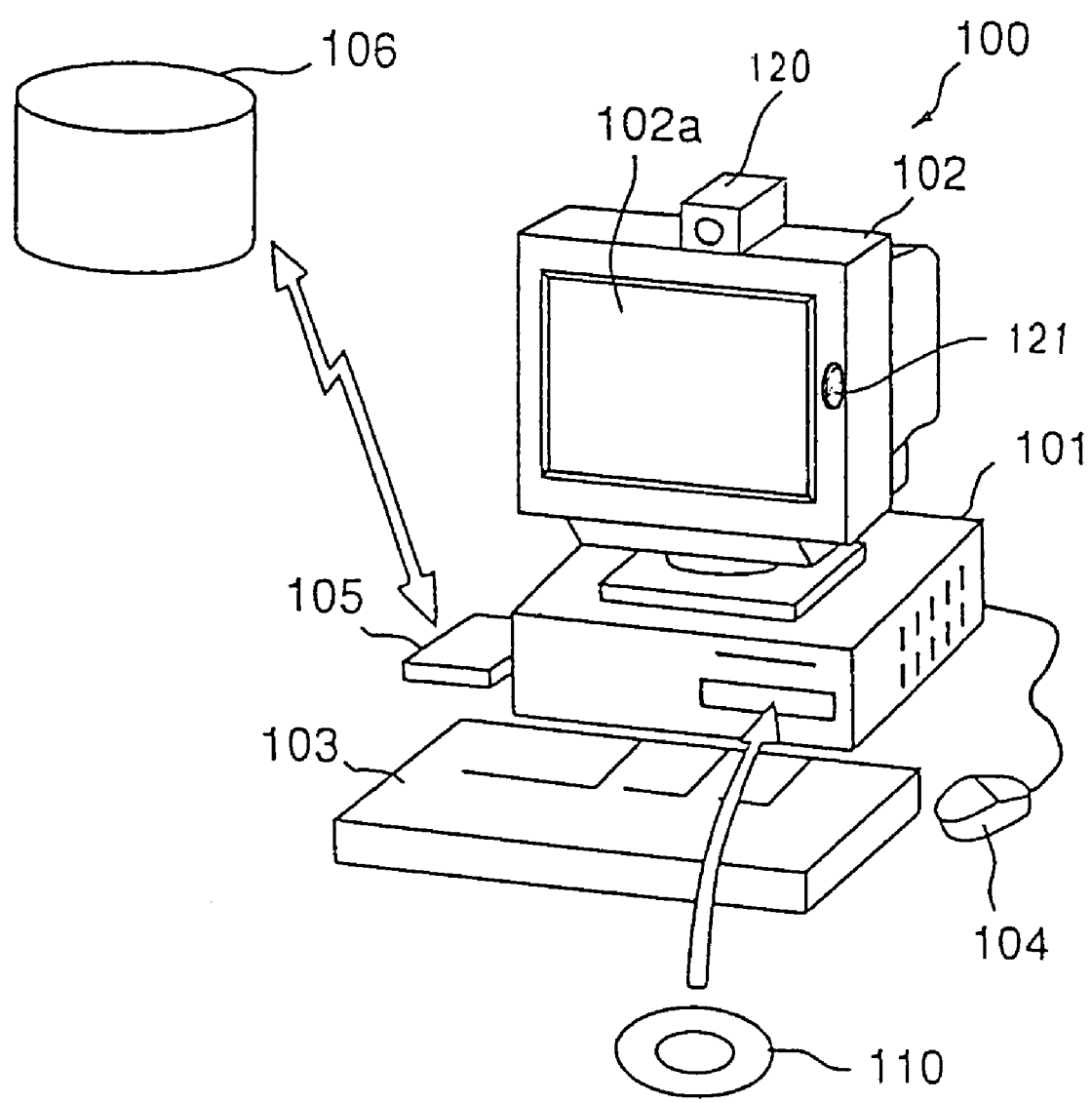
FIG. 1 is a perspective view showing an embodiment of an electronic apparatus according to the present invention.

A description will be given of embodiments of the present invention, by referring to the drawings.

FIG. 1 is a perspective view showing an embodiment of an electronic apparatus according to the present invention. In this embodiment, the present invention is applied to a desk-top type computer system, however, the present invention is of course similarly applicable to a portable type computer system. This embodiment of the electronic apparatus employs an embodiment of a control apparatus according to the present invention which controls the electronic apparatus.

A computer system 100 shown in FIG. 1 generally includes a main body 101 which includes a CPU, a disk drive unit and the like, a display 102 for displaying an image on a display screen 102a in response to an instruction from the main body 101, a keyboard 103 for inputting various kinds of information to the computer system 100, a mouse 104 for specifying an arbitrary position on the display screen 102a of the display 102, a modem 105 for accessing an external database or the like and downloading a program or the like stored in another computer system, an image pickup unit 120 made of a CCD camera or the like, and one or more speakers 121 for reproducing sound.

A program (electronic mail software) which causes the computer system 100 to have an electronic mail function is stored in a portable recording medium such as a disk 110 or, is downloaded from a recording medium 106 of another computer system using a communication unit such as the modem 105. A computer-readable storage medium according to the present invention is formed by a recording medium such as the disk 110 which stores the program. A recording medium which forms the computer-readable storage medium according to the present invention is not limited to portable recording media such as the disk 110, IC card memory, floppy disk, magneto-optical disk and CD-ROM, but also includes various kinds of recording media accessible by a computer system which is connected via a communication means or a communication unit such as the modem 105 and a LAN.

Figure 2:
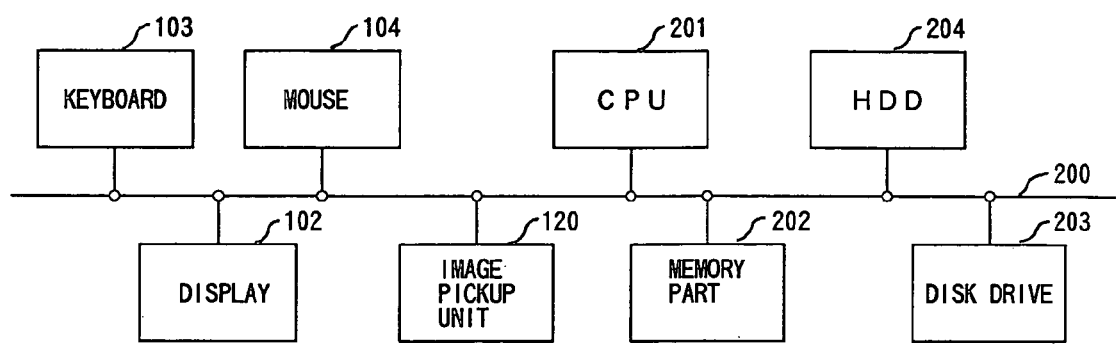
FIG. 2 is a system block diagram for explaining the construction of an important part within a main body of a computer system.

FIG. 2 is a system block diagram for explaining the construction of an important part within the main body 101 of the computer system 100. In FIG. 2, the main body 101 generally includes a CPU 201, a memory part 202 including a RAM, ROM and the like, a disk drive 203 for the disk 110, and a hard disk drive (HDD) 204 which are connected via a bus 200. In this embodiment, the display 102, the keyboard 103, the mouse 104, the image pickup unit 120 and the like are connected to the CPU 201 via the bus 200 as shown in FIG. 2, but these elements may of course be connected directly to the CPU 201. In addition, the display 102 and the image pickup unit 120 may be connected to the CPU 201 via a known graphic interface (not shown) which processes input and output image data.

The construction of the computer system 100 is of course not limited to that shown in FIGS. 1 and 2, and various other known constructions may be used instead.

Figure 3:
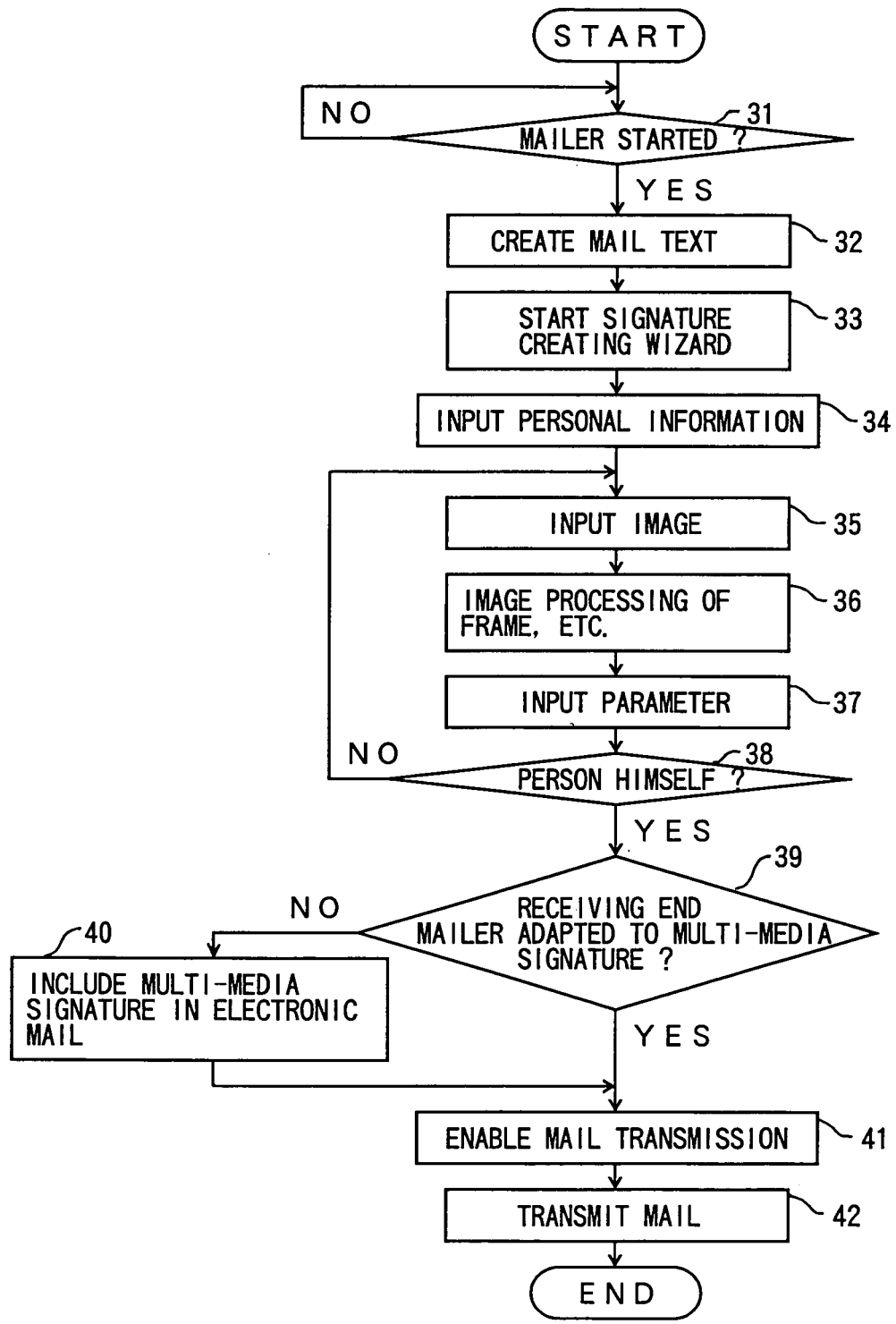
FIG. 3 is a flow chart for explaining the operation of a CPU of the computer system which forms a transmitting end apparatus.

First, a description will be given of the operation when the computer system 100 forms a transmitting end apparatus. FIG. 3 is a flow chart for explaining the operation of the CPU 201 of the computer system 100 which forms the transmitting end apparatus. The process shown in FIG. 3 corresponds to a program which is stored in a first embodiment of the computer-readable storage medium according to the present invention.

In FIG. 3, a step 31 decides whether or not a mailer which generates a multi-media signature file at the transmitting end is started. When the decision result in the step 31 becomes YES, a step 32 creates a mail text or body of an electronic mail by a procedure similar to a known procedure used to create a text-based electronic mail. A signature file generally refers to a file which includes personal information of the user. On the other hand, a multi-media signature file refers to a signature file which adapts to multi-media. In this embodiment, the mailer creates an electronic mail in a HTML language which can simultaneously input audio and image in a multi-media format such as the HTML format or, in a language which conforms to the HTML language. By using the HTML language which adapts to the multi-media, it is possible to include media such as the audio and image into the multi-media signature file.

At a stage where the electronic mail is to be transmitted, a step 33 starts a signature creating wizard for creating a multi-media signature file. A step 34 inputs personal information which is input by the user (sender) from the keyboard 103 or the like. The personal information includes information such as a name, position, URL of home page, telephone number, mail address, and Nifty ID, for example, which are necessary for the multi-media signature file.

A step 35 inputs an image which is input from the image pickup unit 120, including a face of the sender. The image which is input may be a still picture or a motion picture.

A step 36 carries out an image processing such as framing, with respect to the input image. The frame which is added to the input image and an accessory frame which is added to the multi-media signature file may be selected and determined depending on the user's preference. In addition, a step 37 inputs a parameter which is input from the keyboard 103 or the like by the user (sender) and indicates an importance of the electronic mail.

The parameter includes at least one of information which indicates a display priority order of the electronic mail, and character, image and/or audio information which indicates a summary of the electronic mail. In addition, the information which indicates the display priority order of the electronic mail includes at least one of a display position and a display timing of the multi-media signature file. In other words, it is possible to indicate a display priority position of the electronic mail by at least one of the display position and the display timing of the multi-media signature file. Accordingly, the importance of the electronic mail can be indicated by a display format of the signature file, and the electronic mail can be displayed with a format which enables recognition of the importance of the electronic mail by changing the display position or the display timing of the signature file.

In the above described manner, preparations are made to transmit the electronic mail in which a symbol including image information which enables the sender to be specified therefrom is included within the signature file of the electronic mail. In this embodiment, the symbol includes image information and personal information of the sender, which enable the sender to be specified, and the parameter is added to the multi-media signature file. Thus, information used for linking to the sender is included in the symbol.

The information (parameter) which indicates the display priority order may be included in a header of the electronic mail or the mail text, instead of including the information (parameter) within the multi-media signature file. Furthermore, a parameter which indicates the importance of the electronic mail may replace the information or parameter which indicates the display priority order.

Figure 4:
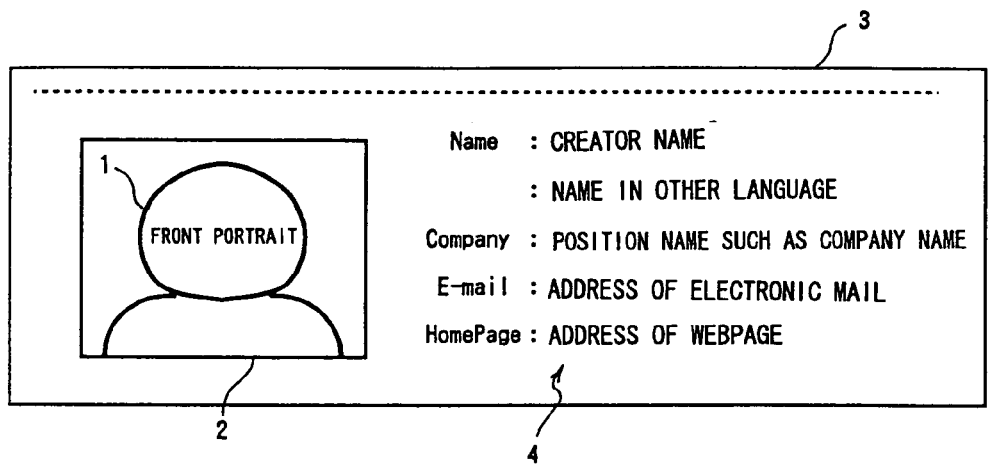
FIG. 4 is a diagram showing an embodiment of a multi-media signature file which is displayed.

FIG. 4 is a diagram showing an embodiment of the multi-media signature file which is displayed. In FIG. 4, displayed information includes an image (input image) 1 of the user (sender), a frame 2 added to the input image 2, an accessory frame 3 added to the multi-media signature file, and personal information 4.

A step 38 decides whether or not an error between the image input in the step 35 and an image which is prestored in the memory part 202 or the like and includes the face of the user (sender) is within a predetermined range. The process returns to the step 35 if the decision result in the step 38 is NO. On the other hand, if the decision result in the step 38 is YES, a step 39 decides whether or not a mailer on a receiving end is adapted to the multi-media signature file. If the decision result in the step 39 is NO, a step 40 includes the multi-media signature file within the electronic mail, and the process advances to a step 41. On the other hand, the process advances to the step 41 if the decision result in the step 39 is YES.

The decision in the step 39 is made based on a selection which is made by the user from the mouse 104, for example. That is, the decision in the step 39 is made based on the selection which determines whether or not the electronic mail is to be transmitted for a mailer which is adapted to the multi-media signature file.

The step 41 enables transmission of the electronic mail. In addition, a step 42 transmits the created electronic mail to a communication network such as the Internet via a known mail server (not shown), and the process ends.

Figure 5:
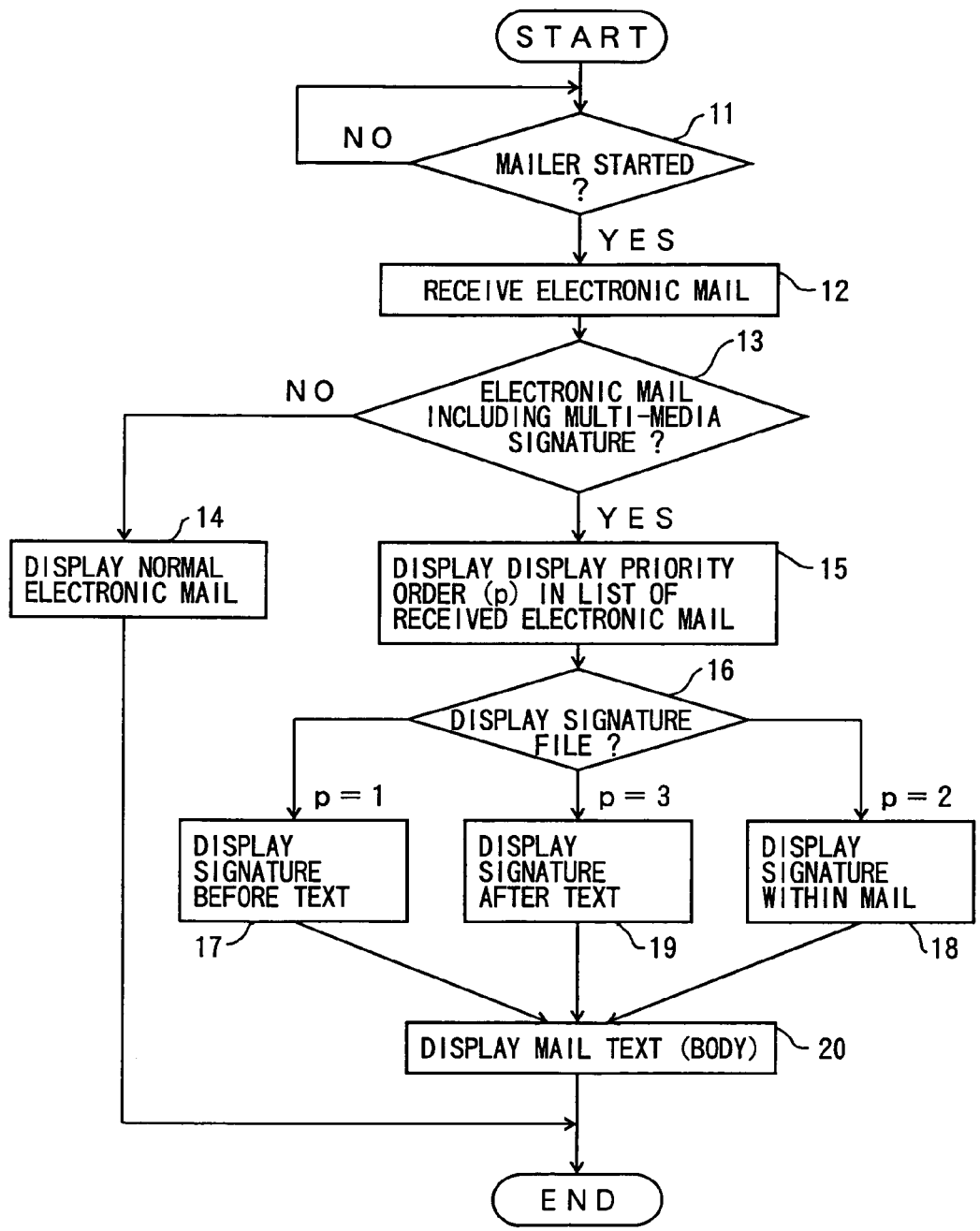
FIG. 5 is a flow chart for explaining the operation of the CPU of the computer system which forms a receiving end apparatus.

Next, a description will be given of the operation when the computer system 100 forms a receiving end apparatus having a mailer which is adapted to the multi-media signature file. FIG. 5 is a flow chart for explaining the operation of the CPU 201 of the computer system 100 which forms the receiving end apparatus. The process shown in FIG. 5 corresponds to a program which is stored in a second embodiment of the computer-readable storage medium according to the present invention.

In FIG. 5, a step 11 decides whether or not a mailer at the receiving end, which is adapted to the multi-media signature file, is started. When the decision result in the step 11 becomes YES, a step 12 receives an electronic mail from a transmitting end apparatus via a communication network such as the Internet and a known mail server (not shown). In this embodiment, it is assumed for the sake of convenience that the received electronic mail has been created by the process described above in conjunction with FIG. 3. Further, it is assumed that information p which indicates the display priority order of the electronic mail is added to the multi-media signature file as the parameter indicating the importance of the electronic mail or, the parameter is included in the mail text or header of the electronic mail.

A step 13 decides whether or not the received electronic mail includes a multi-media signature file. If the decision result in the step 13 is NO, the received electronic mail is a normal or ordinary electronic mail such as that shown in FIG. 6, and thus, a step 14 displays the normal electronic mail on the display 102 by a known means, and the process ends. The normal electronic mail shown in FIG. 6 is not adapted to the multi-media signature file, and is basically text-based.

On the other hand, if the decision result in the step 13 is YES, a step 15 displays the received electronic mail on the display 102 by including the importance of the electronic mail in a list of the electronic mail. In this embodiment, the received electronic mail is displayed by including the display priority order information p in the electronic mail. In this case, the list of the electronic mail is basically the same as a known list, except that an item corresponding to the display priority order information p is added.

A step 16 displays the multi-media signature file on the display 102, based on the display priority order information p. If it is assumed for the sake of convenience that there are three kinds of display priority order information p and that the lower the value of the display priority order information p the higher the display priority order, the process advances to a step 17 if the display priority order information p is p=0, to a step 18 if p=2, and to a step 19 if P 3.

Figure 7:
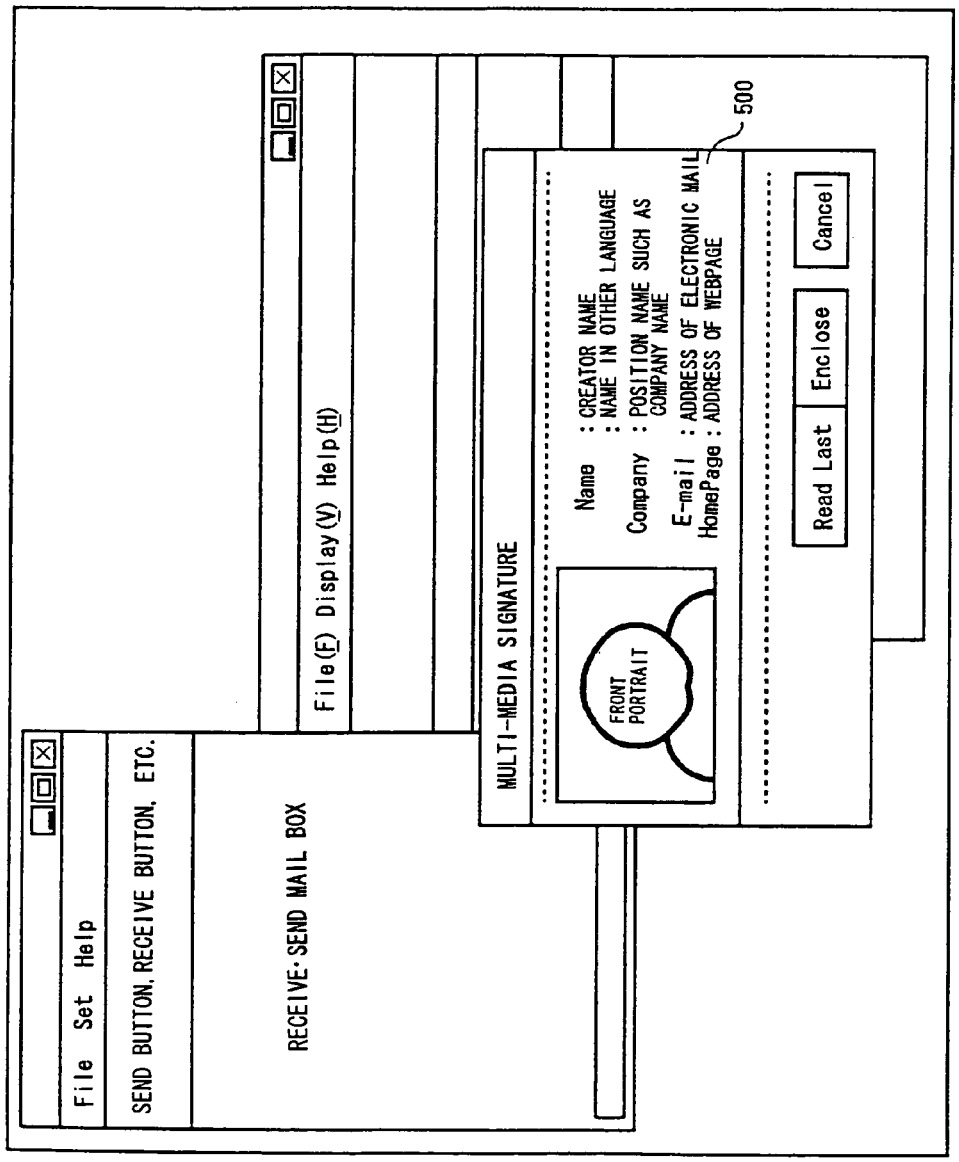
FIG. 7 is a diagram showing a state where the multi-media signature file is displayed on a display before a mail text of an electronic mail.

If the display priority order information p is p=1 which indicates the highest importance of the electronic mail, the step 17 displays the multi-media signature file before or in front of the mail text of the electronic mail displayed in a step 20. FIG. 7 is a diagram showing a state where a multi-media signature file 500 is displayed on the display 102 before the mail text of the electronic mail. When the importance of the received electronic mail is high as in this particular case, the multi-media signature file 500 is displayed before the mail text of the electronic mail, so that the user (recipient) can first confirm the sender of the received electronic mail. In this case, the information of the sender specified by the multi-media signature file 500 has an extremely high reliability, because measures are taken by the process shown in FIG. 3 so that a third person cannot impersonate the sender. Accordingly, the recipient can confirm by a simple means that the sender is the person himself. In addition, since the multi-media signature file 500 is displayed first, that is, before the mail text of the electronic mail, the recipient can comprehend the importance and summary of the contents of the received electronic mail to a certain extent before actually reading the received electronic mail, thereby making it possible to distinguish important electronic mail from junk mail and the like.

Figure 8:
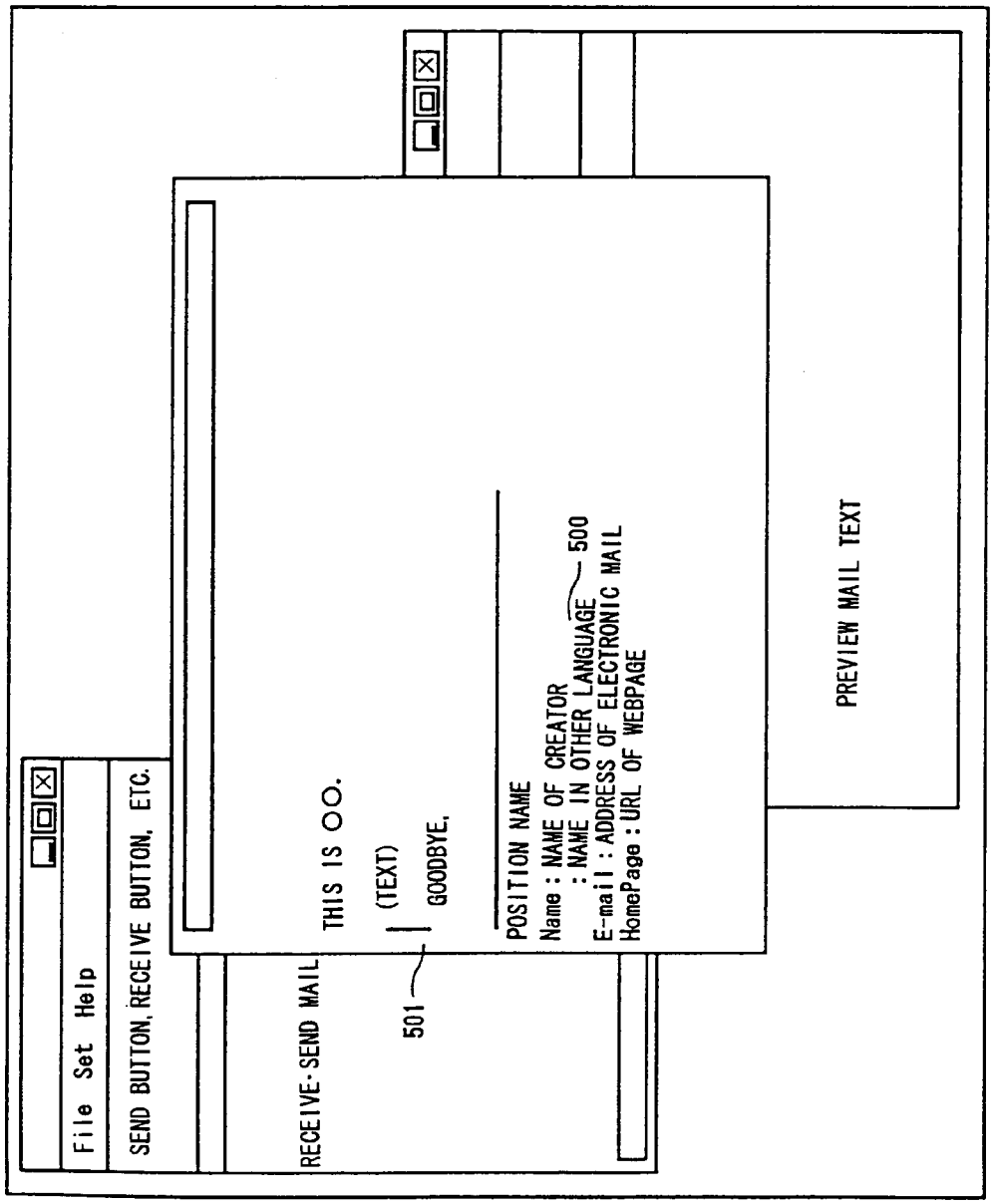
FIG. 8 is a diagram showing a state where the multi-media signature file is displayed on the display within the mail text of the electronic mail.

If the display priority order information p is p=2 which indicates the medium importance of the electronic mail, the step 18 displays the multi-media signature file within the mail text of the electronic mail when displaying the electronic mail in the step 20. FIG. 8 is a diagram showing a state where the multi-media signature file 500 is displayed within a mail text 501 on the display 102. When the importance of the received electronic mail is medium as in this particular case, the multi-media signature file 500 is displayed within the mail text 501 of the electronic mail, so that the user (recipient) can receive the electronic mail similarly to the normal or ordinary electronic mail. Accordingly, since the multi-media signature file 500 is displayed within the mail text 501 of the electronic mail, the recipient can comprehend the importance and summary of the contents of the received electronic mail to a certain extent before actually reading the received electronic mail. In this embodiment, the multi-media signature file 500 which is displayed within the mail text 501 is made up of personal information, similarly as in the case of receiving the normal electronic mail, however, it is of course possible to also display image information and the like of the sender as in the case shown in FIG. 7.

Figure 9:
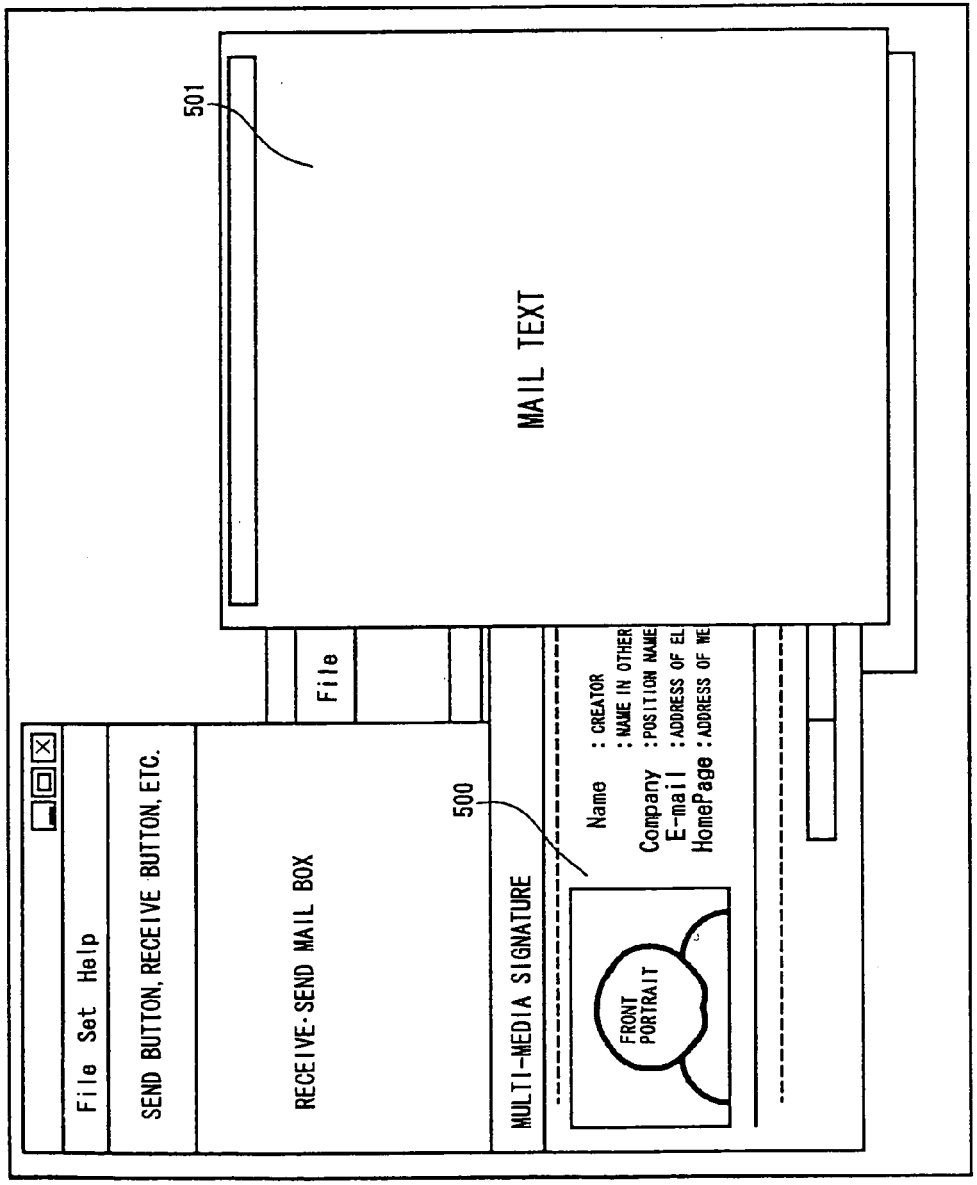
FIG. 9 is a diagram showing a state where the multi-media signature file is displayed on the display after the mail text of the electronic mail.

If the display priority order information p is p=3 which indicates the lowest importance of the electronic mail, the step 19 adjusts a processing sequence so that the multi-media signature file is displayed after or in rear of the mail text of the electronic mail displayed in the step 20. FIG. 9 is a diagram showing a state where the multi-media signature file 500 is displayed after the mail text 501 on the display 102. When the importance of the received electronic mail is lowest as in this particular case, the multi-media signature file 500 is displayed after the mail text 501 of the electronic mail, so that the user (recipient) can simply judge whether or not to actually read the received electronic mail. In other words, because the multi-media signature file 500 is displayed after the mail text 501, the recipient can comprehend the importance and summary of the contents of the received electronic mail to a certain extent before actually reading the received electronic mail.

Figure 10:
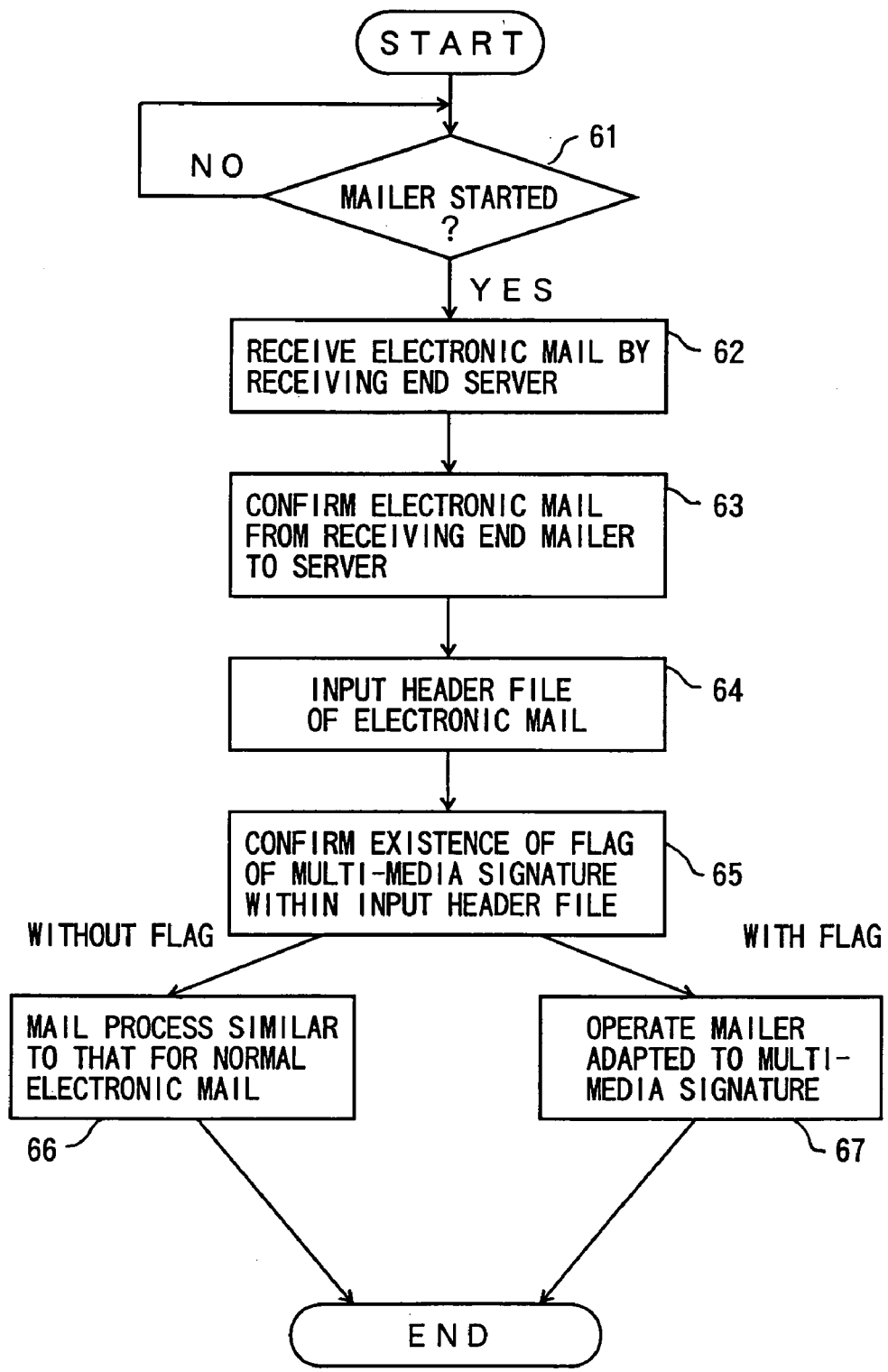
FIG. 10 is a flow chart showing a part of the process shown in FIG. 5 in more detail.

FIG. 10 is a flow chart showing the process of particularly the steps 11 through 13 shown in FIG. 5 in more detail. In FIG. 10, steps 61 through 65 correspond to the steps 11 through 13 shown in FIG. 5, a step 66 corresponds to the step 14 shown in FIG. 5, and a step 67 corresponds to the steps 15 through 20 shown in FIG. 5. In the process shown in FIG. 10, the display priority order information p is used as a flag, and a decision to determine whether the received electronic mail includes the multi-media signature file is made based on this flag.

In FIG. 10, the step 61 decides whether or not the mailer at the receiving end is started. When the decision result in the step 61 becomes YES, the step 62 receives the electronic mail from the transmitting end apparatus via the communication network such as the Internet and a known receiving end mail server (not shown). The step 63 confirms the received electronic mail which is received by the receiving end mail server. The step 64 inputs a header file of the received electronic mail, and the step 65 decides whether or not the input header file includes the flag which indicates the existence of the multi-media signature file. More particularly, this embodiment uses the display priority order information p as the flag.

Accordingly, when the received electronic mail is a normal or ordinary electronic mail having no flag, the process advances to the step 66 which carries out a mail process similar to that with respect to the normal electronic mail, and the process ends. On the other hand, if the received electronic mail includes the multi-media signature file and the flag exists, the process advances to the step 67 which carries out the mail process adapted to the multi-media signature file, and the process ends.

As described above, the parameter which indicates the importance of the electronic mail includes at least one of the information indicating the display priority order of the electronic mail, and the character, image and/or audio information indicating the summary of the electronic mail. In addition, the information indicating the display priority order of the electronic mail includes at least one of a display position and a display timing of the multi-media signature file. In the embodiments described above, the information indicating the display priority order of the electronic mail is used as the parameter, however, the user (recipient) can similarly comprehend the importance of the received electronic mail when the character, image and/or audio information indicating the summary of the electronic mail is used as the parameter. For example, the character information indicating the summary of the electronic mail may be related to a summary or the like of the mail text of the electronic mail. The image information indicating the summary of the electronic mail may be related to the kind or nature (urgent, normal, circulating, and the like) of the mail text of the electronic mail. Moreover, the audio information indicating the summary of the electronic mail may be related to an audio message for informing the kind or nature of the mail text of the electronic mail, for example. In this case, the audio message can be reproduced by a known means such as a plug-in driver module, and output from one or more speakers 121 shown in FIG. 1.

Figure 11:
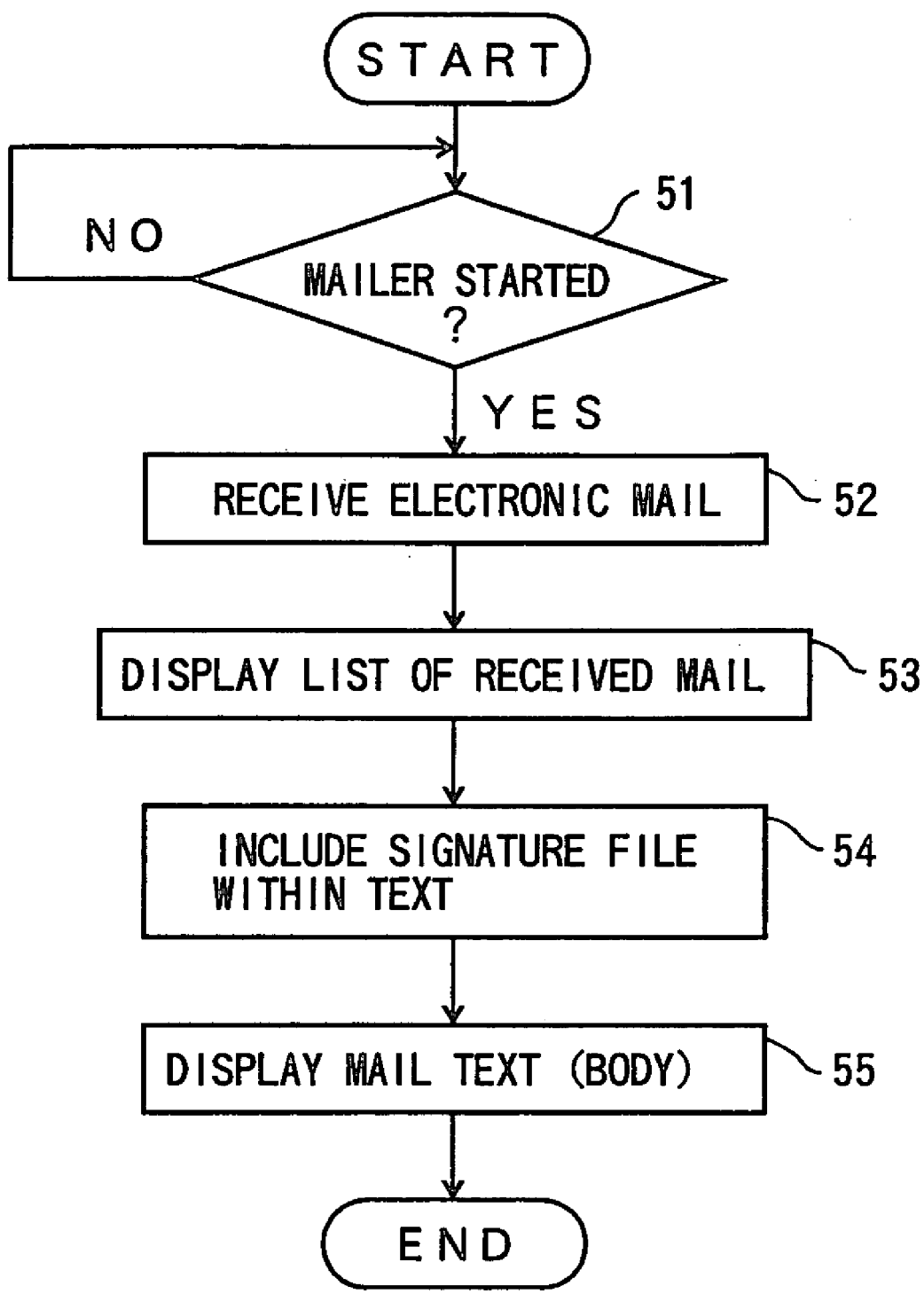
FIG. 11 is a flow chart for explaining the operation of the CPU of the computer system which forms a receiving end apparatus.

Next, a description will be given of the operation when the computer system 100 forms a receiving end apparatus having a mailer which is not adapted to the multi-media signature file. FIG. 11 is a flow chart for explaining the operation of the CPU 201 of the computer system 100 which forms the receiving end apparatus. The process shown in FIG. 11 corresponds to a program which is stored in a third embodiment of the computer-readable storage medium according to the present invention.

In FIG. 11, a step 51 decides whether or not the mailer at the receiving end, which is not adapted to the multi-media signature file, is started. When the decision result in the step 51 becomes YES, a step 52 receives an electronic mail from a transmitting end apparatus via a communication network such as the Internet and a known mail server (not shown). A step 53 displays a list of the received electronic mail on the display 102. A step 54 includes the multi-media signature file within the mil text of the electronic mail. A step 55 displays the mail text of the electronic mail, including the multi-media signature file, on the display 102, and the process ends.

In a case where the sender knows beforehand that the recipient is not adapted to the multi-media signature file, and the step 40 in the process shown in FIG. 3 includes the multi-media signature file within the mail text of the electronic mail to process the same as a single electronic mail, the received electronic mail is processed similarly to the normal electronic mail by the process shown in FIG. 11. However, the sender may indicate the importance of the electronic mail by a position in the electronic mail where the multi-media signature file is included. For example, by including the multi-media signature file at a beginning of the mail text of the electronic mail, the recipient may comprehend from the multi-media signature file which is displayed at the beginning position of the mail text of the electronic mail that the importance of the electronic mail is high.

Moreover, in the embodiments, the display position or the display order of the multi-media signature file is changed depending on the parameter which indicates the display priority order or the parameter which indicates the importance. However, the display position or the display order of the signature file which includes no image information or the signature part within the electronic mail may be changed depending on the display priority order or the importance. In the case of such a modification, the technique used to change the display position or the display order of the signature file in the embodiments described above may be employed to change the display position or the display order of the signature consisting solely of characters, so that the display is made with a format which enables recognition of the importance.

In the embodiments described above, the image which includes the face of the sender is a still picture or a motion picture which is picked up. However, the image which includes the face of the sender may be a drawn portrait or an animation. In other words, the image information which enables the sender to be specified in each of the embodiments described above includes still picture, motion picture, drawn portrait, animation and the like.

Further, the present invention is not limited to these embodiments, but various variations and modifications may be made without departing from the scope of the present invention.

What is claimed is:

1. An electronic apparatus comprising:
a transmitter transmitting electronic mail in which a symbol including image information, which enables a sender to be specified therefrom, is included within an electronic signature file of the electronic mail, said electronic signature file including an email address of the sender, wherein said transmitter transmits the electronic mail only when an error, between the image information and prestored image information, is less than a predetermined value, and an adding unit adding to the electronic signature file a parameter which indicates an importance of the electronic mail by a display format of the electronic signature file.

2. The electronic apparatus as claimed in claim 1, further comprising:
a generator generating the image information by inputting an image of the sender.

3. The electronic apparatus as claimed in claim 1, wherein the image information includes an image related to at least a face of the sender.

4. The electronic apparatus as claimed in claim 1, wherein the parameter includes information which indicates a display priority order of the electronic mail.

5. The electronic apparatus as claimed in claim 1, wherein the parameter includes character, image and/or audio information indicating a summary of the electronic mail.

6. The electronic apparatus as claimed in claim 4, wherein the information which indicates the display priority order of the electronic mail includes at least one of a display position and a display timing of the electronic signature file.

7. The electronic apparatus as claimed in claim 1, wherein the symbol includes information affording linking to the sender.

8. An electronic apparatus comprising:
a receiver receiving electronic mail in which a symbol including image information which enables a sender to be specified therefrom is included within an electronic signature file of the electronic mail, said electronic signature file including an email address of the sender and a parameter which indicates an importance of the electronic mail;
a recognizing unit recognizing the importance based on the parameter;
a display controller displaying, based on the information which indicates the importance of the electronic signature file, the electronic signature file on said display unit with a format which enables recognition of the importance; and
a display unit displaying the image information of the electronic mail, wherein said receiver receives the electronic mail only when an error, between the image information and prestored image information, is less than a predetermined value.

9. The electronic apparatus as claimed in claim 8, wherein the image information includes an image related to at least a face of the sender.

10. The electronic apparatus as claimed in claim 8, wherein said receiver receives information which indicates a display priority order of the electronic signature file, and further comprising:

a determining unit determining a display position of the electronic signature file based on the information which indicates the display priority order of the electronic signature file.

11. The electronic apparatus as claimed in claim 8, wherein said receiver receives information which indicates a display priority order of the electronic signature file, and further comprising:

a determining unit determining a display timing of the electronic signature file based on the information which indicates the display priority order of the electronic signature file.

12. The electronic apparatus as claimed in claim 11, wherein the information which indicates the display priority order of the electronic signature file is included within the electronic signature file.

13. The electronic apparatus as claimed in claim 8, wherein the electronic signature file includes character, image and/or audio information indicating a summary of the electronic mail.

14. The electronic apparatus as claimed in claim 8, wherein the symbol includes information used for linking to the sender.

15. An electronic apparatus comprising:

a receiver receiving an electronic mail including at least an electronic signature file and information which indicates an importance thereof, said electronic signature file including an email address of a sender and a symbol including image information which enables the sender to be specified therefrom;

a display unit displaying the electronic mail; and a display controller displaying the signature information on said display unit with a format which enables recognition of the importance, based on the information which indicates the importance, wherein said receiver receives the electronic mail only when an error, between the image information and prestored image information, is less than a predetermined value.

16. An electronic apparatus comprising:

a transmitter transmitting an electronic mail by adding to an electronic signature file of the electronic mail a parameter which indicates an importance of the electronic mail by a display format of the electronic signature file, said electronic signature file including an email address of a sender and a symbol including image information which enables a sender to be specified therefrom, wherein said transmitter transmits the electronic mail only when an error, between the image information and prestored image information, is less than a predetermined value.

17. A control apparatus for an electronic apparatus having a transmitter, comprising:

a controller controlling the transmitter to transmit electronic mail in which a symbol including image information which enables a sender to be specified therefrom is included within an electronic signature file of the electronic mail, said electronic signature file including an email address of the sender and a parameter which indicates an importance of the electronic mail by a display format of the electronic signature file, wherein said transmitter transmits the electronic mail only when an error, between the image information and prestored image information, is less than a predetermined value.

18. A control apparatus for an electronic apparatus having a receiver receiving an electronic mail and a display unit displaying the received electronic mail, comprising:

a controller controlling said receiver to receive an electronic mail in which a symbol including image information which enables a sender to be specified therefrom is included within an electronic signature file of the electronic mail, and controlling said display unit to display the image information of the electronic mail and, based on the information which indicates the importance of the electronic signature file, the electronic signature file on said display unit with a format which enables recognition of the importance, said electronic signature file including an email address of the sender and a parameter which indicates an importance of the electronic mail by a display format of the electronic signature file, wherein said receiver receives the electronic mail only when an error, between the image information and prestored image information, is less than a predetermined value.

19. A control apparatus for an electronic apparatus comprising:

a receiver receiving electronic mail including at least an electronic signature file and information which indicates an importance thereof and a display unit displaying the received electronic mail; and a display controller controlling said display unit to display the electronic signature file with a format which enables recognition of the importance, based on the information which indicates the importance, said electronic signature file including an email address of a sender and a symbol including image information which enables the sender to be specified therefrom, wherein said receiver receives the electronic mail only when an error, between the image information and prestored image information, is less than a predetermined value.

20. A computer-readable storage medium which stores a program for causing a computer to have an electronic mail function, comprising:

a transmitting section causing the computer to transmit electronic mail in which a symbol including image information which enables a sender to be specified therefrom is included within an electronic signature file of the electronic mail, said electronic signature file including an email address of the sender and a parameter which indicates an importance of the electronic mail by a display format of the electronic signature file, wherein said transmitting section causes the computer to transmit the electronic mail only when an error, between the image information and prestored image information, is less than a predetermined value.

21. A computer-readable storage medium which stores a program for causing a computer to have an electronic mail function, comprising:

a receiving section causing the computer to receive an electronic mail in which a symbol including image information which enables a sender to be specified therefrom is included within an electronic signature file of the electronic mail, said electronic signature file including an e-mail address of the sender and a parameter which indicates an importance of the electronic mail by a display format of the electronic signature file; and a display section causing the computer to display the image information of the electronic mail and, based on the information which indicates the importance of the electronic signature file, the electronic signature file on said display unit with a format which enables recognition of the importance, wherein said receiver receives the electronic mail only when an error, between the image information and prestored image information, is less than a predetermined value.

22. A computer-readable storage medium as which stores a program for causing a computer to have an electronic mail function, comprising:

a receiving section causing the computer to receive electronic mail including at least an electronic signature file and information which indicates an importance thereof, said electronic signature file including an email address of a sender and a symbol including image information which enables the sender to be specified therefrom;

a display section causing the computer to display the electronic mail; and a display control section causing the computer to display the electronic signature file by said display section with a format which enables recognition of the importance, based on the information which indicates the importance, wherein said receiving section causes the computer to receive the electronic mail only when an error, between the image information and prestored image information, is less than a predetermined value.

* * * * *